US010107031B2

(12) United States Patent
Koester

(10) Patent No.: US 10,107,031 B2
(45) Date of Patent: Oct. 23, 2018

(54) WING-UP LIGHT-DIRECTING SLAT, METHOD OF PRODUCTION, APPLICATION, AND SUN PROTECTION SYSTEM

(71) Applicant: Helmut Koester, Frankfurt (DE)

(72) Inventor: Helmut Koester, Frankfurt (DE)

(*) Notice: Subject to any disclaimer, the term of this patent is extended or adjusted under 35 U.S.C. 154(b) by 406 days.

(21) Appl. No.: 14/652,046

(22) PCT Filed: Dec. 12, 2013

(86) PCT No.: PCT/IB2013/060877
§ 371 (c)(1),
(2) Date: Jun. 12, 2015

(87) PCT Pub. No.: WO2014/091449
PCT Pub. Date: Jun. 19, 2014

(65) Prior Publication Data
US 2015/0315841 A1    Nov. 5, 2015

(30) Foreign Application Priority Data

Jan. 12, 2013 (DE) .................. 10 2013 100 319
Nov. 19, 2013 (DE) .................. 10 2013 019 295
Dec. 12, 2013 (DE) .................. 10 2012 112 255

(51) Int. Cl.
| | |
|---|---|
| E06B 9/264 | (2006.01) |
| E06B 9/24 | (2006.01) |
| E06B 9/40 | (2006.01) |
| G02B 5/09 | (2006.01) |
| E06B 9/386 | (2006.01) |

(52) U.S. Cl.
CPC ............ *E06B 9/264* (2013.01); *E06B 9/24* (2013.01); *E06B 9/386* (2013.01); *E06B 9/40* (2013.01); *G02B 5/09* (2013.01); *E06B 2009/2417* (2013.01); *E06B 2009/2643* (2013.01); *G02B 2207/123* (2013.01)

(58) Field of Classification Search
CPC . F21S 11/00; G02B 19/0019; G02B 19/0042; G02B 27/0006; E06B 9/00; E06B 9/264
USPC ......................................... 359/613, 301–602
See application file for complete search history.

(56) References Cited

U.S. PATENT DOCUMENTS

| | | | | |
|---|---|---|---|---|
| 4,509,825 A * | 4/1985 | Otto | .................. | F21S 11/00 |
| | | | | 160/236 |
| 4,773,733 A * | 9/1988 | Murphy, Jr. | ............ | E06B 9/386 |
| | | | | 160/176.1 R |
| 6,845,805 B1 * | 1/2005 | Koster | .................. | E06B 9/386 |
| | | | | 160/236 |
| 8,243,359 B2 * | 8/2012 | De Ruijter | ............ | E06B 9/386 |
| | | | | 359/290 |

* cited by examiner

*Primary Examiner* — Darryl J Collins
*Assistant Examiner* — Kristina Deherrera
(74) *Attorney, Agent, or Firm* — DLA Piper LLP (US)

(57) ABSTRACT

Light guiding slat for a sun protection system, wherein the light guiding slat is made of a band material equipped with a Fresnel reflector made by folding and/or bending the band material whereby the light guiding slat has a total height (G) which is so small that the light guiding slat has a form to be coilable with a coiling radius of 1 m or less without any substantial plastic deformation.

12 Claims, 12 Drawing Sheets

Figure 4:
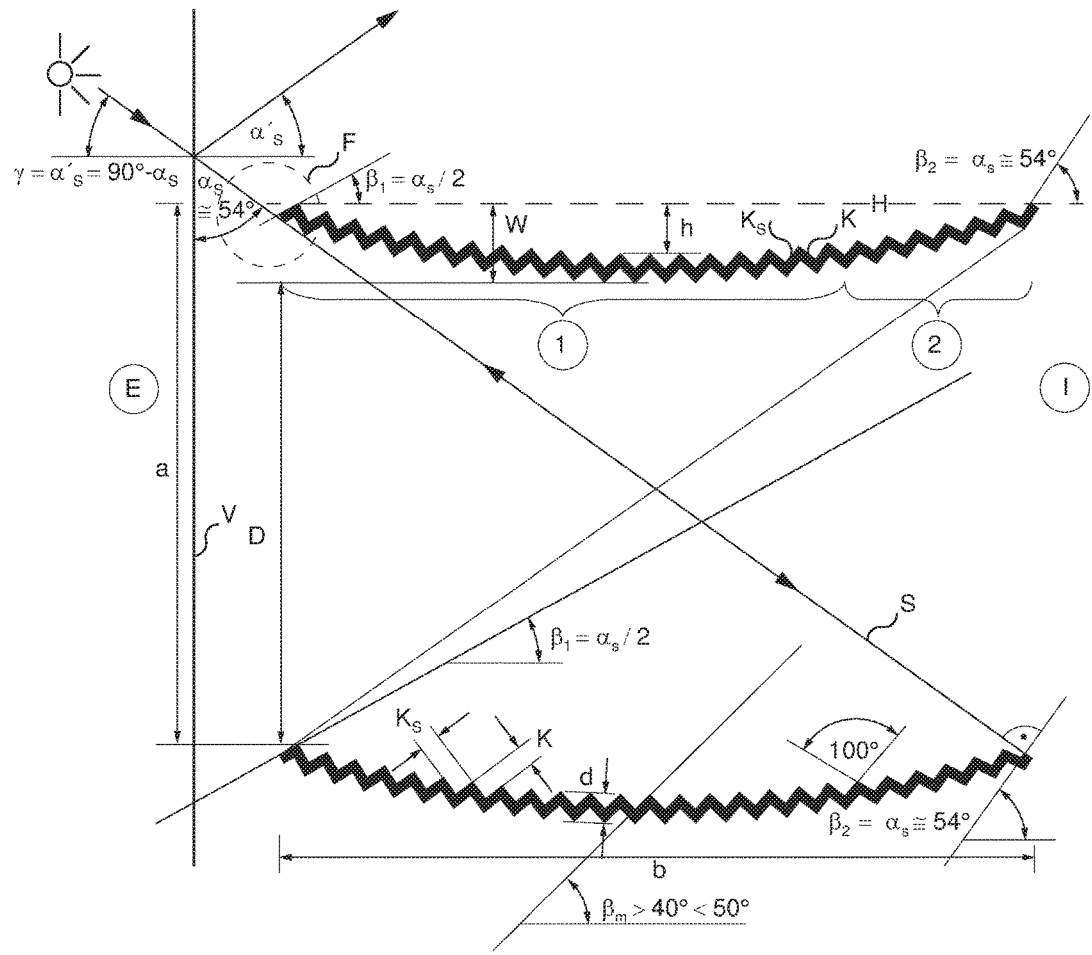

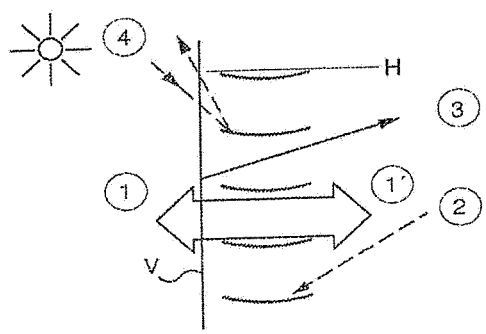
Fig. 0
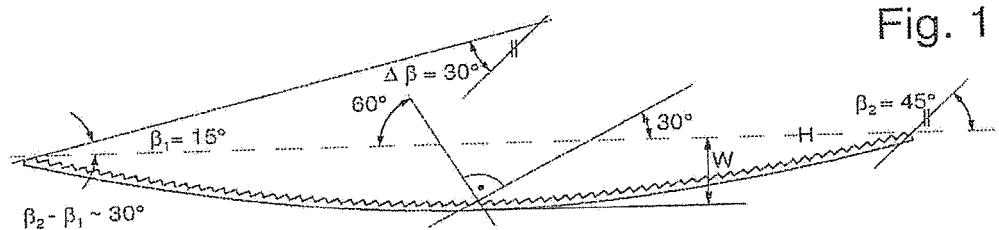
PRIOR ART
Fig. 1
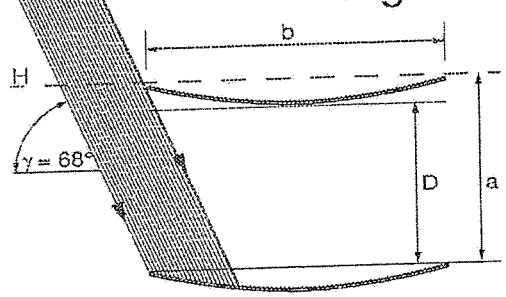
PRIOR ART
Fig. 1.1
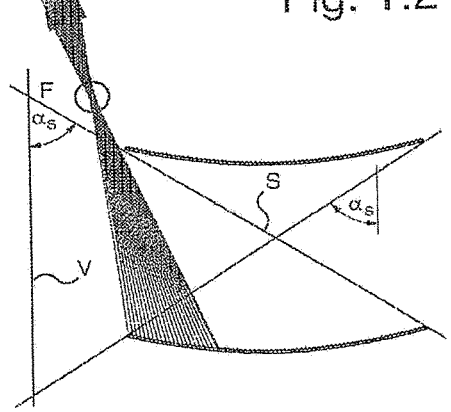
PRIOR ART
Fig. 1.2

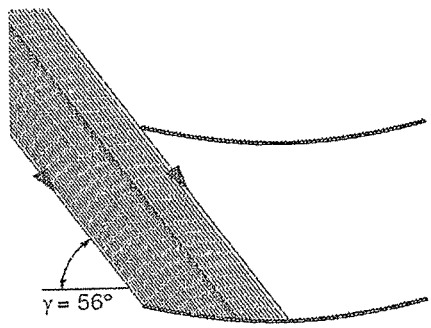
Fig. 2.1 PRIOR ART
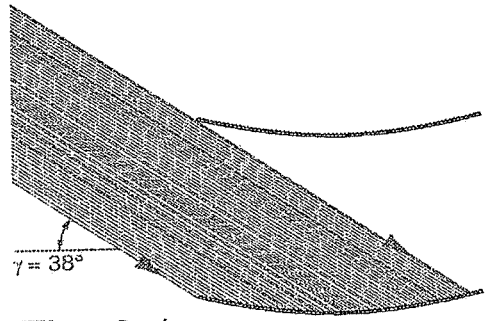
Fig. 3.1 PRIOR ART
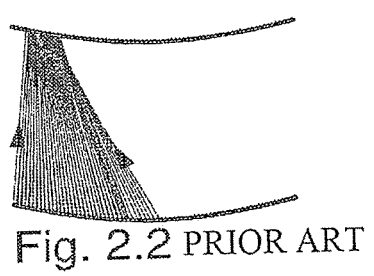
Fig. 2.2 PRIOR ART
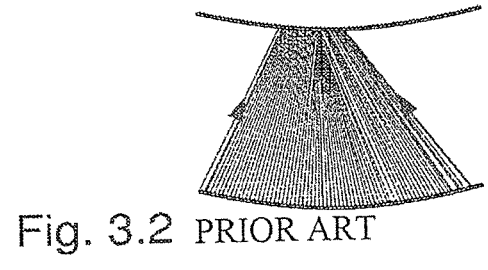
Fig. 3.2 PRIOR ART
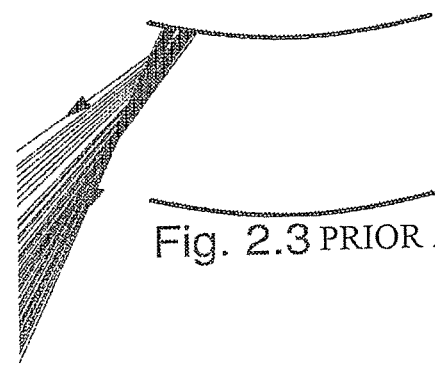
Fig. 2.3 PRIOR ART
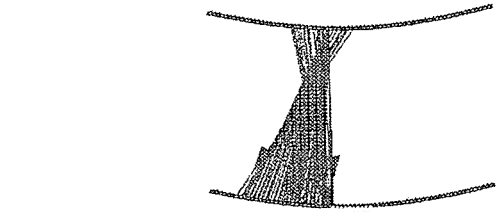
Fig. 3.3 PRIOR ART
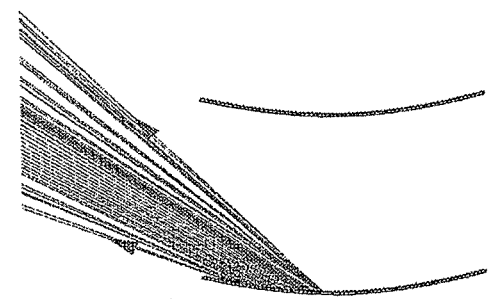
Fig. 3.4 PRIOR ART

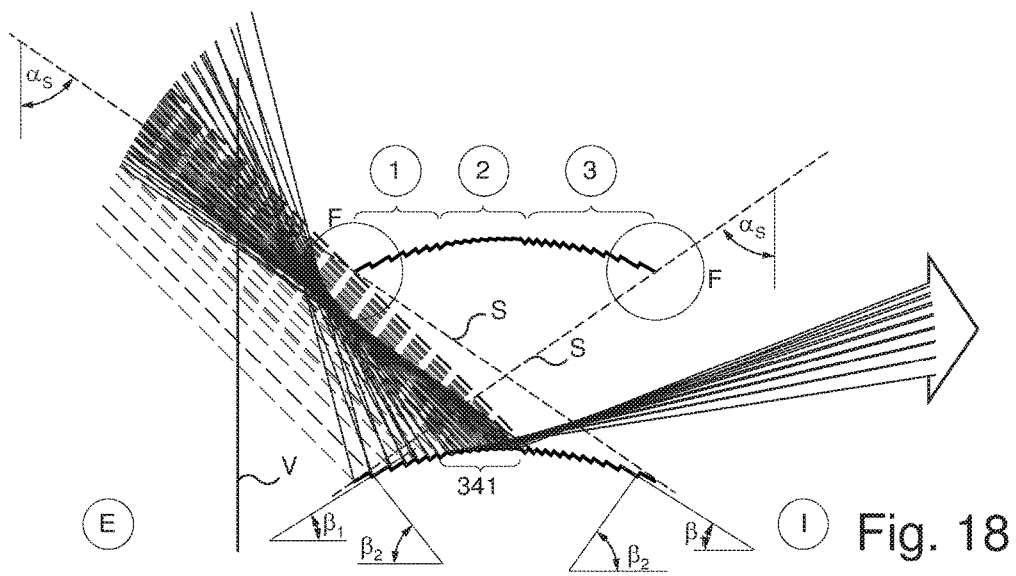
Fig. 18
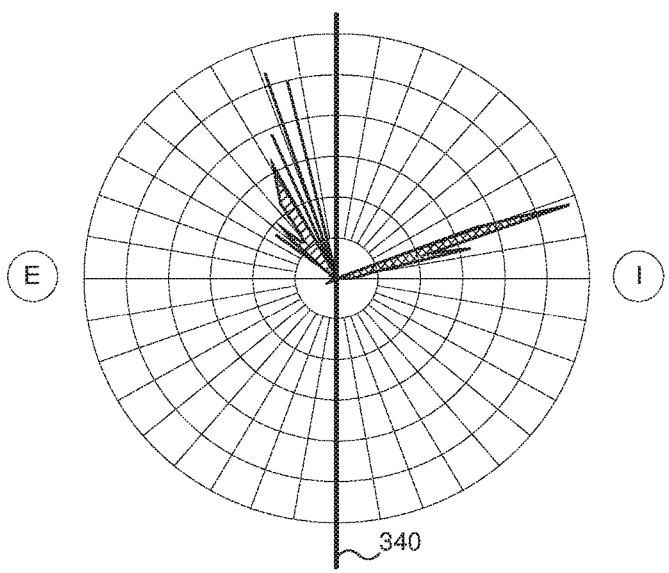
Fig. 18.1
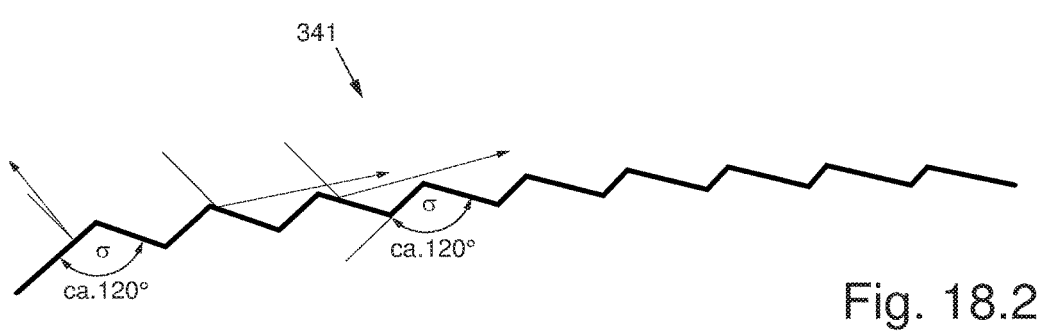
Fig. 18.2

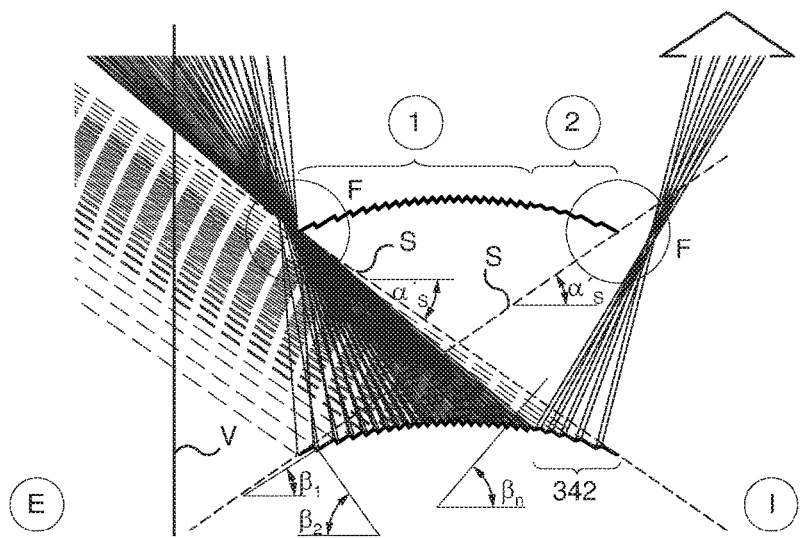
Fig. 19
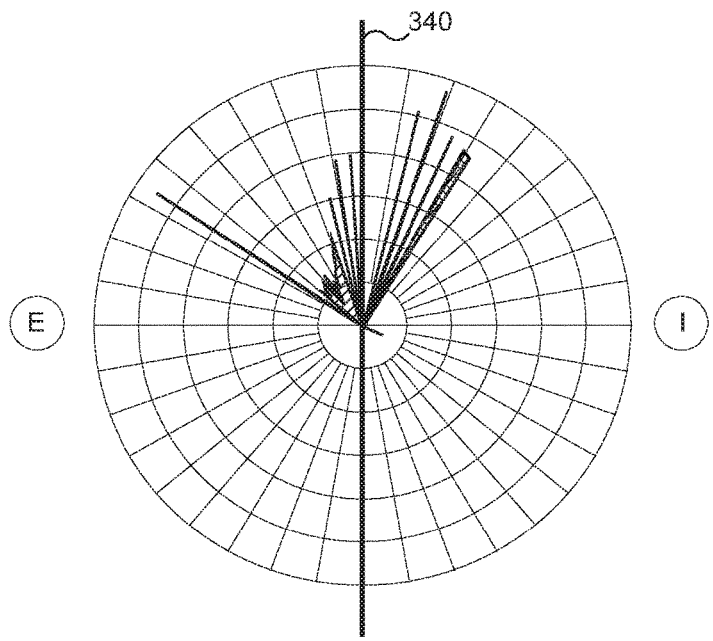
Fig. 19.1
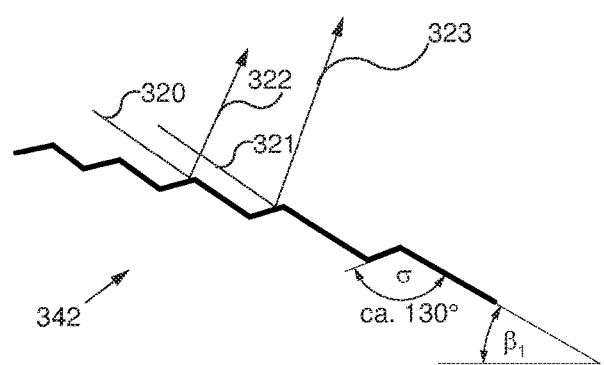
Fig. 19.2

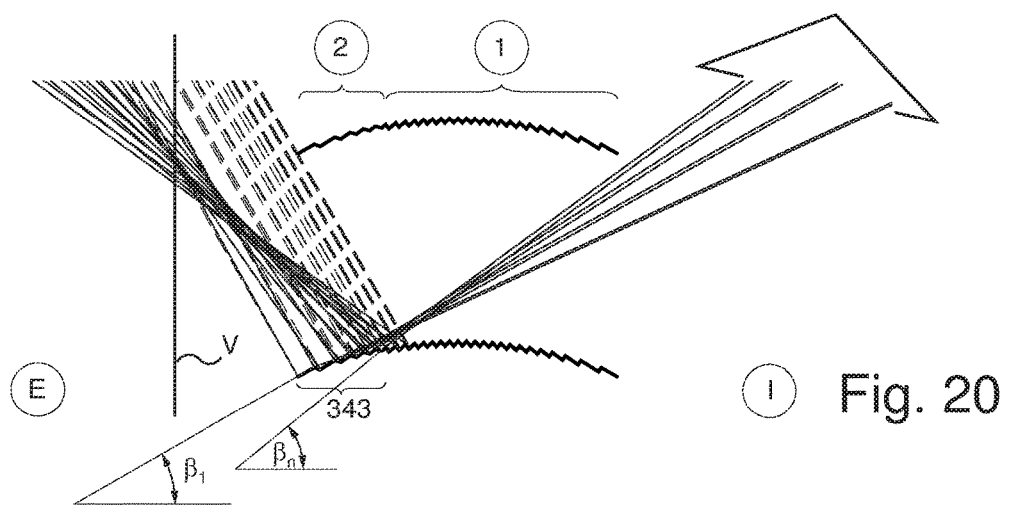
Fig. 20
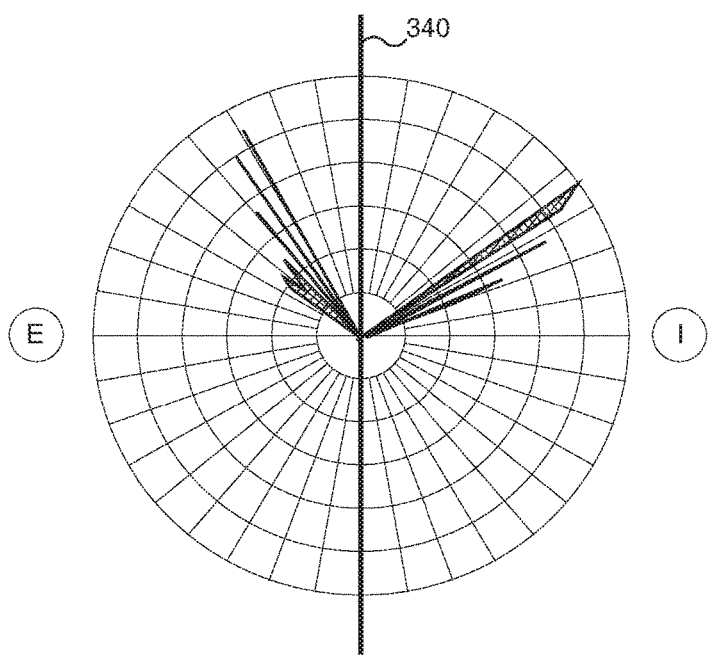
Fig. 20.1
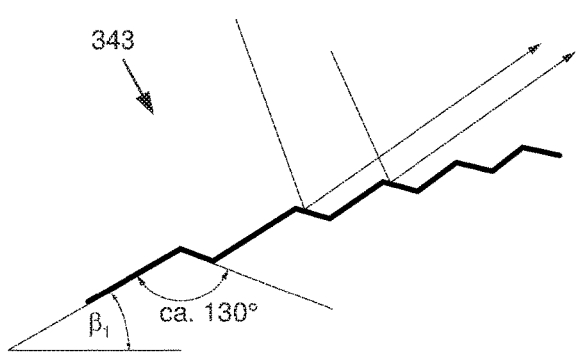
Fig. 20.2

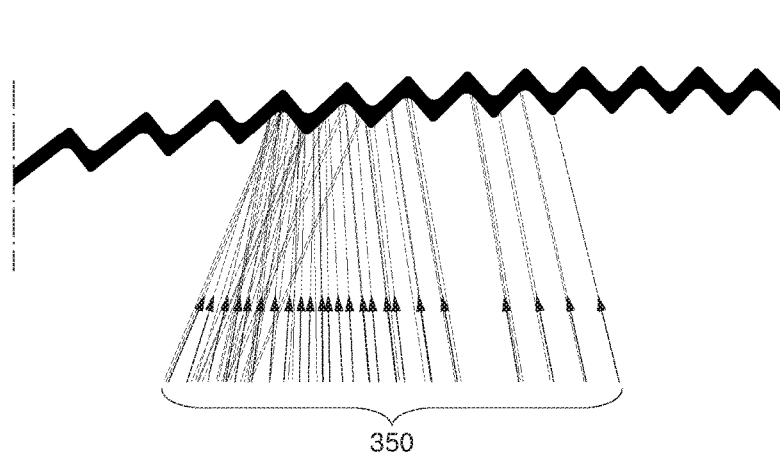
Fig. 21.1
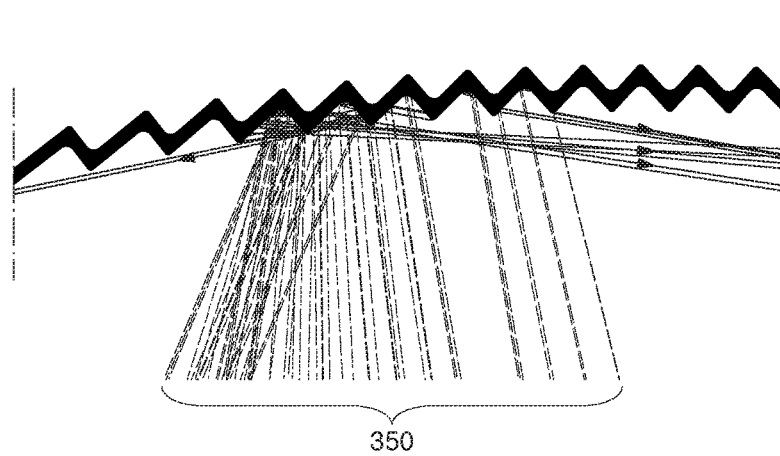
Fig. 21.2
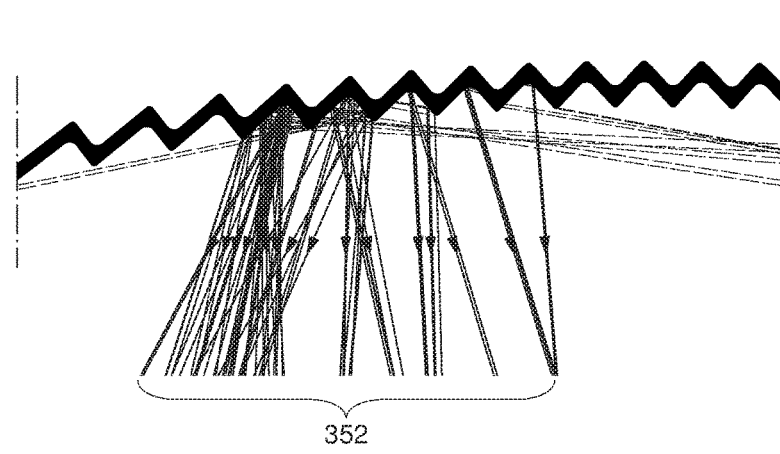
Fig. 21.3

WING-UP LIGHT-DIRECTING SLAT, METHOD OF PRODUCTION, APPLICATION, AND SUN PROTECTION SYSTEM

The present invention relates to a light guiding slat made of a band material, and a sun protection system with fold-shape structured light-directing slats having at least light-reflective slat upper sides with parallel fold grooves. In proper operation, the folds have a sun-radiated fold side $K_S$ and a substantially shadowed fold side K. The present invention relates, in addition to methods of production as well as the application of the light-directing slat in a sun protection system.

It has been known to form slats in fold-shape while the folds are worked-in either by embossing only into the upper side, or the slats are shaped out, at least partly, in large folds. It is of disadvantage that these slats are rigid and can no longer be wound on a coil for further processing. The folds will either deform or the slats will twist without springing back to their straight original position. Wound-up slats, in particular, might crease, i.e. they might for instance deform plastically so that the light guiding properties might be impaired.

From patent documents DE 44 1342, DE 10 2009 056 360 A1, it has been known to produce Venetian blinds from slats with prism contours which include partly a first portion oriented to a sun light irradiation side, and a second portion oriented towards the interior space. The Venetian blinds slats are provided, at least partly with longitudinal grooves having prism-shaped reflective surfaces. The sun side $K_S$ of the prismatic mirrors is oriented towards the sun irradiation and a shadow side K to the interior space. The Venetian blinds slats are arched out concavely/convexly. In WO 2011/1344 29 A1, in FIG. 17a, a light deflection of an edged horizontally disposed slat is shown, as a problem, which back-reflects, and focuses, the incident light into the irradiation cross section while not defining the slat contour to obtain focussing and glare freedom in an outer glazing. Neither are the slats, as would be common, curve-shaped in cross section but rather s-shaped or edged, and are not, therefore, suited to be processed on existing Venetian blinds automats for the production of concave-convexly shaped slats.

A general objective for light-directing Venetian blinds systems consists in that in case of a possibly open Venetian blind, i.e. most possible flat slat angle of incidence, the direct sun be deflected and, at the same time, as a consequence of the flat slat position, a very good view-through is obtained and, additionally, make furthermore possible an increased diffuse light entry for improved interior space daylight illumination. The Venetian blinds systems and the slat mirrors should, moreover, be glare-free for the user of the interior space.

Figure 9:
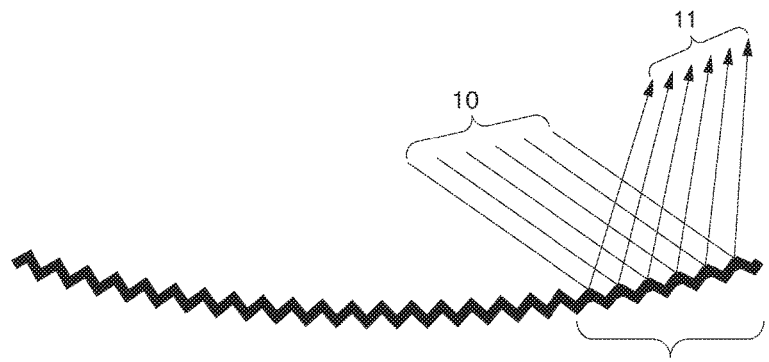
Figure 8:
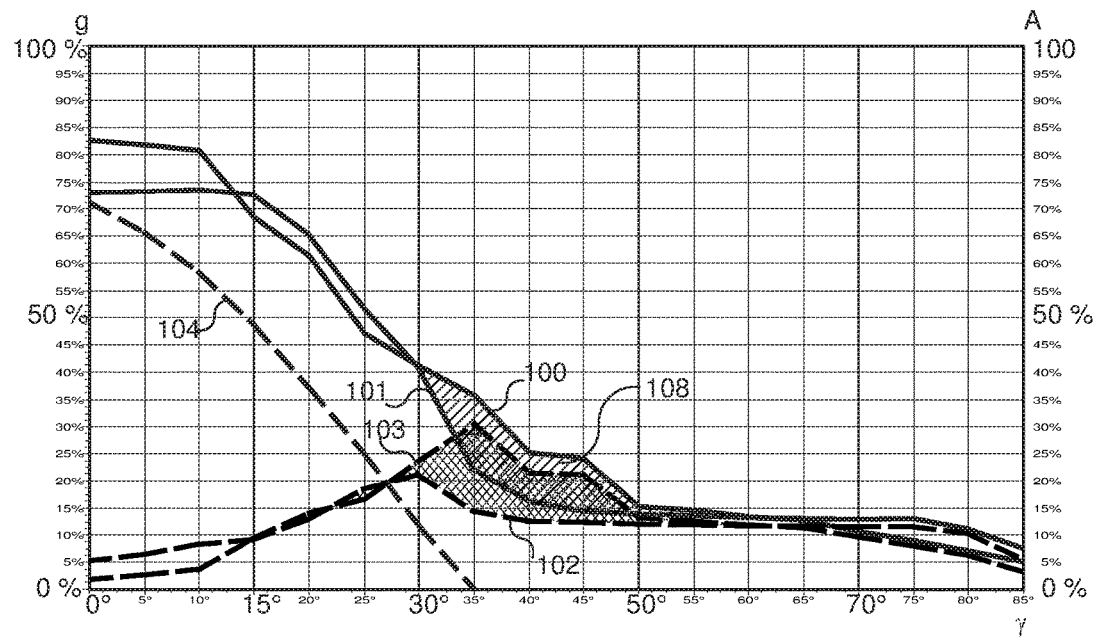

In order to reach this goal, the prior art has developed slat contours with Fresnel optics. In U.S. Pat. No. 6,367,937 B2, slats are shown having a structural mirror upper side and a smooth or a stepped slat under side. In FIGS. 8 and 9, the slats are shown for different angles of incidence. From the reflection, it becomes apparent that this constitutes Fresnel optics having a focus in the area of the front sun longitudinal edge of the slat positioned towards irradiation incidence. In order to avoid glare in the glass panes, the focus is disposed, in EP 1 21 508 B1, so that a critical angle $\alpha_S$ (FIG. 1.2) is not exceeded. To this end, the slats follow the angular height of the sun.

The disadvantage of the Fresnel structure according to FIGS. 3 and 4 of EP 1 21 508 B1 consists in that the slats have to be disposed in a tilted position at an angle of incidence of 45° already which causes that the view-through between the slate and the light entry is reduced. A further disadvantage is that at an angle of incidence of >45° in FIG. 4 even in a tilted slat position already a second reflection on the under side of the slats will occur. An additional disadvantage is seen in that, as a consequence of the concentrated impact of reflected radiation, the under sides might flash up which leads to extreme glare.

In FIGS. 3 and 4 of EP 1 212 508 B1, light guiding slats are shown having prisms which a cathetus inclination of 30°/60° relative to the hypotenuse, wherein the flat-pitched longer 30° catheti are oriented to the incidence of the sun and the 60° catheti are oriented towards the interior space (see also FIG. 1). In case of a horizontal slat position, these prism-structured slats will not yield mono-reflectivity before an angle of incidence $\gamma>62°$ is reached. The maximum height of the sun on the $50^{th}$ degree of latitude is 64°. According to the present state of the art, pendulum reflections will come up between the slats in the case of horizontal slat position, notwithstanding the prism structuring, which produce avoidable heating up. Good high-purity aluminium reflectors having anodized surfaces will reach 86% total reflection, 14% of the radiation will be absorbed. When pendulum reflection occurs between the slats, the absorption of the inciding light rays will increase after 2 reflections already to about 28%, in case of 3 reflections to more than 30%. In case of an irradiation of 700/watts/m², this will correspond to a heat absorption of 210 watts/m². To avoid such high energy absorption in the case of open slat position and summery high sun incidence, is the aim of the present innovation as demonstrated in FIG. 0.

FIG. 1 shows an enlarged representation of the slats of FIG. 3 and FIG. 4 of EP 1 212 508 B1. In FIGS. 1.1 and 1.2. as well as in the further figures, the radiation patterns on the slats according to FIG. 1 are shown. FIG. 1.1 shows the radiation incidence onto an horizontally arranged slat at an angle $\gamma=68°$ and a desired view-through D between the slats of D/a~85%. In FIG. 1.2, the back-reflection from FIG. 1.1 into the outer space is shown. A focus F is obtained in the outer space. In FIG. 2.1, a sun incidence $\gamma=56°$ is shown. In FIG. 2.2, the back-reflection is deflected to the under side of the upper slat. From this slat under side, the light is back-reflected, in the case of a mirror coating of the under side. according to FIG. 2.3, to the bottom plane in the outer space. Therefore, at the summery angle of incidence $\gamma=56°$ already, two reflections are required to deflect the sun with the Venetian blinds opened. FIGS. 3.1 to 3.4 show a light incidence $\gamma=38°$ onto the slat of FIG. 1. In FIG. 3.2, the light deflection to the under side of the upper slat, in FIG. 3.3 the back-reflection onto the underside of the lower slat, and in FIG. 3.4 the back reflection into the outer space is shown. In the present case, therefore, at least 3 reflections are required to deflect the sun. Counterproductive overheating of the window area should, therefore, be expected.

Figure 13:
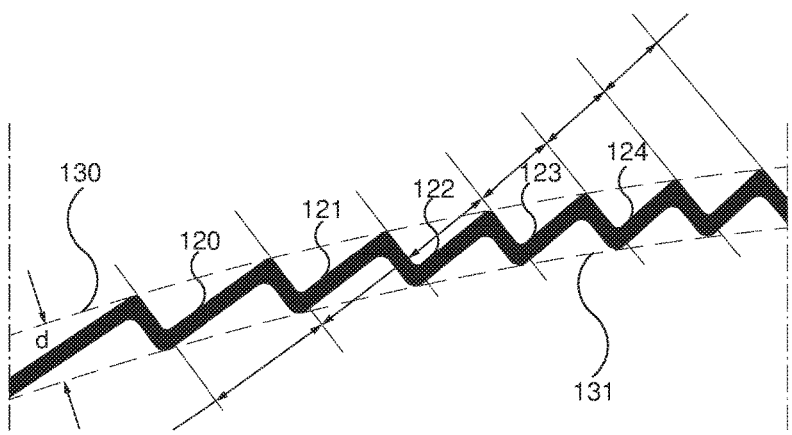
Figure 12:
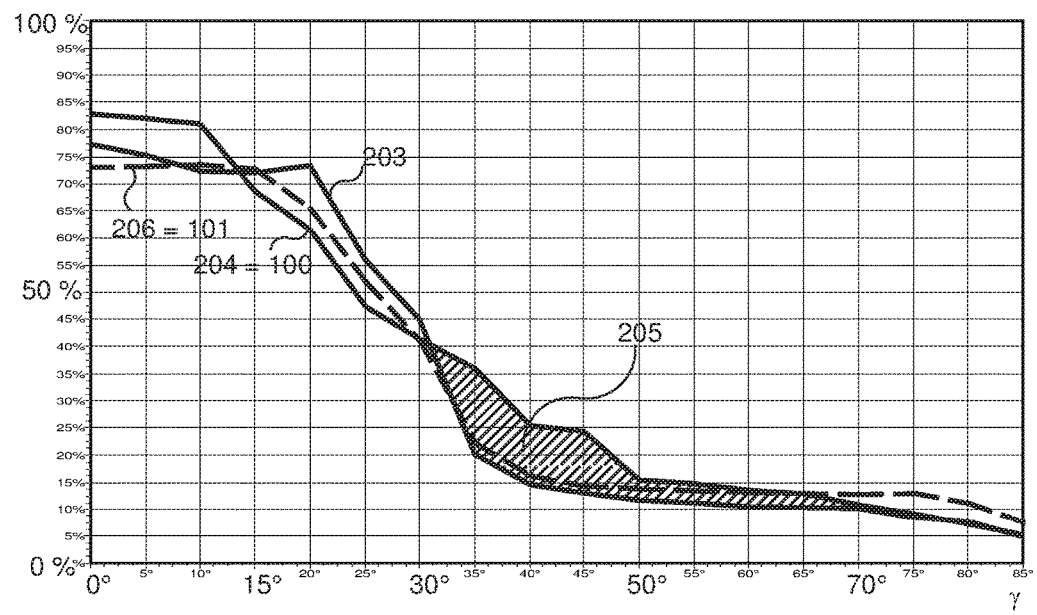
Figure 11:
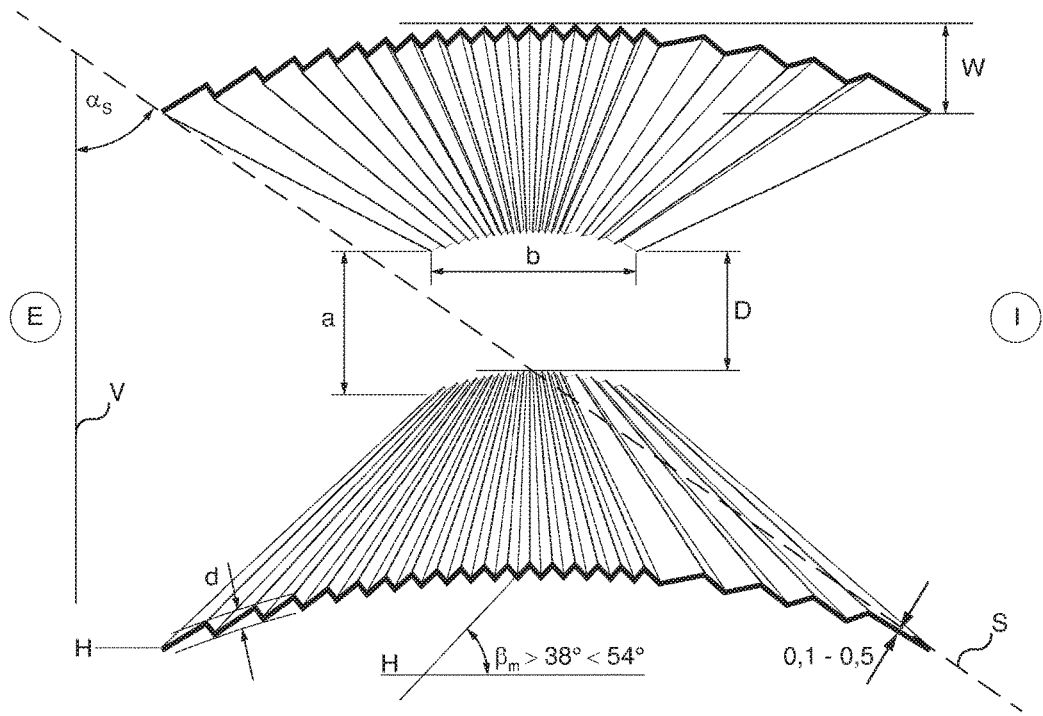

Fold-shaped slats as shown in FIGS. 11-13 of ED 1 212 508 B1 cannot with a view to the large steps be coiled up without deforming the folds and bending the slats.

In FIGS. 8 and 9 of EP 1 212 508 B1, slats having extremely different cross sectional thicknesses are shown. The disadvantage of such slats is that they cannot be produced from a ready-manufactured surface-treated band material but rather only as extruded slats with the disadvantage of subsequent surface treatment. A further disadvantage is that the ready and extruded slats cannot be wound up on coils and be stored at the premises of the subsequent processing plant. The slats can only be further processed when cut in a costly way to pieces of desired lengths. In this case, too, particularly in connection with FIG. 9, glare might come up on the under side of the slats.

The object of the invention is defined by the features of claim 1.

The radius of 1 m might be required for particularly sensitive slats having a low flow limit, for instance those made of soft highly reflective aluminium. A typical radius of a coil has a maximum of 60 cm so that a slat suited for such bending radius can at least be coiled, in a thin layer, onto such a coil to be transported or stored. Typically, however, the coiling core of such coils has a substantially smaller diameter so that it is preferred that the slat having a radius of 5 cm, particularly preferred of 10 cm or 15 cm, may be coiled up. A coil may then be covered with a lot of slat material up to a non-critical maximum diameter. If a slat is wound onto a too-low coiling radius, it will deform which means that after decoiling, bending of the slat remains and/or the slat crumples, for instance at the sides of the folds. Since many materials show a small plastic hysteresis at elastic deformation, an unavoidable small plastic deformation may remain even in case of a permissible coiling radius. In particular, no crumpling will occur. Slats to be coiled up having such plastic deformations fall within the scope of the invention as well, which is meant by the wording "without any substantial plastic deformation" in claim 1. The same applies for plastic deformations by creeping behaviour of materials over a long period of time. The bending radius without any substantial plastic deformation depends on the material strength, the modulus of elasticity and the total height of the light guiding slat in the radial direction of the bend. Thicker slats are stressed already at less bending, i.e. at larger bending radii so that they may more easily be plastically deformed. The total height of the slat may in this way adjusted to the bending radius to be reached and to the flow limit to render them better coilable. The total height is composed of the height through the concave/convex arching of the total form and of the height of the folds. The height of the folds results, depending on the shape of the slat, from the distance of parallel straight lines or parallel curves passing through the tips of the folds. The thickness of the band material will not substantially change by deforming it into fold shape so that on the upper side and on the under side of the light guiding slat the same contour can be seen.

A reflector in the meaning of the present application need not have the optimum reflection like a mirror. By horizontal slat position, a concave, convex or plane slat is to be understood the end points of which are substantially on a horizontal.

The folds are substantially produced, according to the invention, by folding and/or bending the band material.

As typical embodiments, slats or slat geometries or a sun protection system is suggested which fulfils at least one, or a combination, of the following requirements or includes the following features:

In an embodiment that can be combined with all other embodiments in which in the cross section of the light guiding slat, in cross direction, a plurality of, or all, fold edges on the upper side and a plurality of, or all, fold edges on the under side are disposed each on one of two assumed parallel straight lines or parallel curves, two parallel lines and/or two parallel curves are each spaced from each other at a distance of less than 1.0 mm, preferably of less than 0.5 mm. This leads to a smaller thickness of the slat which is in many case well suited for coiling up.

In an embodiment that can be combined with all other embodiments, the light guiding slat can be made in particular of a band material having a base material thickness of 0.1 mm to 0.5 mm, preferably a base material thickness of 0.1 mm to 0.3 mm.

A. With Respect to Manufacture

1. Concave-convex slat contours which when taken from a coil may be further processed to venetian blinds in traditional venetian blinds automats and permit the manufacture of a flexible slat concave/convex in cross section which even after the fold-shape structuring and after unwinding from the coil springs back into a straight shape.

2. Manufacture of the slats from the ready and surface-treated spring-hard band material in roll and/or roll-forming processes, which after structuring may be coiled up again and stored without deforming or bending the slats.

B. With Respect to Light Technological Points of View:

3. Good view-through D between the slats in horizontal slat position, also to assure the diffuse day light entry between the slats by optimization of the ratio of slat width b to slat distance a 4. De-glaring the slat upper sides in that rays inciding onto the slats are back-reflectable primarily in sun radiation direction while no reflections of the sun fall into the observer's eye, preferably 5. De-glaring the glass panes which include a sun protection system with slats for all sun rays which in case of horizontal slat arrangement are back-directed by a suitable upper side contour into the outer glazing in that the reflections on the outer panes in case of horizontal slat position will not be visible from an observer's position in the interior space 6. Light deflection preferably monoreflectively towards the irradiation side substantially for angles of sun incidence which are larger than the shadow line between two slats to ensure minimum total energy transmission or a sun protection function in the meaning of passive cooling in case of horizontal slat position 7. Deglazing the slat under sides.

FIG. 11 shows the perspective of the micro folding of a typical slat having a width of 25 mm, in multiple enlargement. This slat corresponds to the contour of FIG. 19.

While the slats become stiffer by micro folding, an absolutely desired effect though, they do not deform when they are wound onto a large core. By using a hard base material having an elastic limit R>300 N/mm$^2$, preferably R>400 N/mm$^2$, the slat remains flexible. Although the band will be strained by the fold formation and material thickness change will occur, the slat may receive a ready surface prior to the forming-in. Varnishes even anodized surfaces and PVD layers will undergo micro folding without being destroyed.

A further advantage of micro folding is the slenderness and the little total height h of the slats and hence an improved view-through D. In view of the thin base material, glares will no longer occur on the slat edges either.

Another advantage is the possibility of use for processing an annealed soft band material that can easily be moulded and will obtain its final hardness by straining caused by micro deformation. Within one pass in the roller or embossing tool, a material strain of about 40% takes place, which leads to an extreme hardness. Caused by the micro folding, the softer base material will first start flowing during one single pass in the tool whereby easy deformability and after the glow a great final hardness will be obtained. Particularly advantageously, soft annealed base materials are used which will obtain in the final hardening an elastic limit of >300 up to 500 N/mm$^2$, even 500 up to 600 N/mm$^2$, and hence elastic properties with sufficient resetting ability.

The advantage of the invention can also be seen in the ease of fabrication of the slat contours from very thin band material of metallic material such as aluminium, high-quality steel, brass or from plastic materials or plastic foils and the further processing off the coil as in the case of common Venetian blinds.

Of preference is elastic material of minimum material thickness. This will be assured by using band material having a thickness of <0.5 mm, preferably 0.1 mm to 0.3 mm, and a fold height of d<1.0 mm, preferably d<0.5 mm. Folds having small dimensions as compared to the dimensions of the slat are preferably provided for the slat.

In one embodiment, folds, or sun sides $\beta_n$ are shaped so that the primary reflection for angles of incidence <angle $\alpha_S$ of the shadow line S constitutes the only reflection while up to an angle of incidence $\gamma=90°$ no pendulum reflections between the slats will occur. With a view to the given objectives and for any optional distance of the slats from one another, the correct mirror prism or fold contour may be found, particularly for a horizontal slat position in order to simultaneously realize a largest possible view-through D and, in spite of shadowing, high daylight entry. By the folding of the under sides, moreover, de-glaring can be obtained in that the under sides are only partly visible in view of the foldings and reflected radiation is primarily guided into the upper sides of the lower slats and therefrom back to the outer space from which the sun irradiation emanates FIGS. 21.1 to 21.3).

The sun sides $K_S$ have preferably, in case of a horizontal slat position relative to the horizontal, an angle $\beta_1$ in an irradiation area E and a larger angle $\beta_2$ towards the interior space I. Valid is $\beta_1<\beta_2$. The light guiding slats have a width b and a distance a relative to each other so that between the light guiding slats a horizontal view-through D results. Between an upper slat edge in irradiation area E and a lower slat edge towards the interior space I, a shadow line S at an angle $\alpha_S$ relative to the vertical V is formed.

The angle of shadow line $\alpha_S$ relative to the glazing plane may be obtained from a connecting line between the edge of an upper slat facing the sun irradiation side and the edge of the lower slat facing the interior space.

In an embodiment of the light guiding slat, the complete upper side of the light guiding slat is covered by folds. In this way, the upper side is used at optimum for light directing.

In a further embodiment of the light guiding slat, the total shape of the light guiding slat is concavely or convexly arched in cross direction, and the arching height of the concave or convex arc is less than $1/9$ and more than $1/14$, preferably $1/11$ of o slat width.

In a further embodiment of the light guiding slat, its upper side and/or its under side has, at least partly, a metallic glaze wherein at least one of the fold edges of the folds or between two folds deglazing is provided by means of a varnish cover, in particular also portions of a sun side and/or shadow side of one of these folds, wherein these parts are adjacent, particularly to the fold edge.

In a further embodiment of the invention, a light guiding slat is suggested where at least part of the fold contours, particularly all fold contours, are symmetrically formed in a cross section in cross direction of the light guiding slat about a middle axis (y) so that the contour of the light guiding slat in the cross section, at least partly and particularly completely, is composed of two mirror-inverted slat cross sectional parts (300, 301). This embodiment and its further developments are of original significance and Applicant reserves the right to submit in this context an independent patent application.

In a further development, a plurality of shadow sides (K), particularly all shadow sides (K), are formed by reflection at a mirror plane at least approximately proceeding in elevation height setting of the light guiding slat and through the centre of the light guiding slat in cross direction, at least partly mirror-inverted to sun sides ($K_S$). Properties of the slat are, therefore, contained in two opposite irradiation directions. The shadow sides (K), sections of a fragmented shadow side parabolic groove in the kind of a Fresnel reflector and the sun sides ($K_S$) preferably form sections of a fragmented sun side parabolic groove in the kind of a Fresnel reflector, wherein the shadow side parabolic groove and the sun side parabolic groove intersperse each other section-wisely. This makes two focussing systems possible on the same upper side of a slat. The shadow side parabolic groove, a shadow side focussing zone ($F_2$) and the sun side parabolic groove have a sun side focussing zone ($F_1$) each disposed, at least approximately, in an assumed plane each, which for the shadow side parabolic groove extends from the sun longitudinal edge and for the sun side parabolic groove from the shadow longitudinal edge in elevation height setting each, wherein a parabola axis ($x_2$) of the shadow side parabolic groove extends, at least approximately, through the sun longitudinal edge of the light guiding slat and the shadow side focussing zone ($F_2$), and a parabola axis ($x_1$) of the sun side parabolic groove extends, at least approximately, through the shadow longitudinal edge of the light guiding slat and the sun side focussing zone ($F_1$). This orientation of the parabolic grooves is particularly advantageous in connection with the light directing properties of the slats. The light directing properties of the light guiding slats remain after a rotation of the light guiding slat about 180° about an axis in its elevation height setting preferably the same, at least approximately. The slat can, therefore, be further processed without any regard to the direction of the installation.

A further aspect of the invention relates to a sun protection system with a slat according to one of the aforementioned embodiments. In one embodiment of the sun protection system, the distance between the light guiding slats is about the same as the distance between a focussing zone and that of one of the longitudinal edges of the light guiding slat. The position of the focussing zone results from the irradiation in the direction of the shadow line. Light from the lower slat will not, in view of the concentration in the focussing zone, fall onto the under side of the following upper slat if a steeper irradiation direction than the direction of the shadow line causes that die focussing zone moves away from the slat. In this way, one single reflection is sufficient to guide inciding sun light away from the sun protection system and from an interior space to be protected. In case of a more flat irradiation, the focussing zone may move to the under side of the upper slat so that sun radiation reflected on the lower slat into the focusing zone is further reflected, in a section reflection on the under side of the upper slat, into an outer space on an irradiation side of the sun protection system. In order to obtain the effects referred to, a Fresnel reflector may be provided on the upper side of the slats with a suitable alignment which effects the positioning referred to. of the focussing zone. If between the outer space and the sun protection system a glazing is arranged, no reflection will, preferably at least approximately, occur on the glazing visible from the interior space to be protected. This may be obtained by a suitable provision of the under side of the upper slat and a suitable design of the Fresnel reflector. The aspect of the sun protection system described in the present application is considered of independent significance, and the Applicant reserves the right to submit in this connection a separate patent application.

A further aspect of the invention relates to methods for the manufacture of the light guiding slats. In one embodiment of the method for the manufacture it is suggested to produce the variants of geometry of an upper side of the light guiding slat as defined in the claims and/or the specification by embossing the slat upper sides, particularly by roller stamping moulds, wherein the under side is not embossed and preferably remains smooth, to which end the under side may be treated on a non-embossing roller. Embossing may require a greater material thickness than the folded variants and/or a soft starting material. Slats produced in that way may be employed in a sun protection system as defined in the claims and/or the specification or may be used for a sun protection system according to the application claims. The method for the manufacture may be used for the production of all embodiments of light guiding slats and particularly for the production of the geometries of light guiding slats as described in the specification and/or the claims, wherein the process feature possibly suggested for one embodiment or geometry, i.e. that folds have to be made in the upper side by bending, folding or tilting, and/or that the band material after remoulding has a substantially uniform thickness, need not necessarily be applied. However, a concave/convex total shape of the light guiding slat might for instance be produced by bending, embossing, particularly roll-embossing, during the folding. This embodiment of the method of manufacture is considered of independent significance and the Applicant reserves the right in this connection to submit a separate patent application.

In a further aspect of the invention, the use of light guiding slats is suggested. By the use of light guiding slats of identical type in various areas of a sun protection system with different functions, advantages in connection with the costs and higher quality safety in the production of the sun protection system will result. This aspect of the invention is considered of independent significance and the Applicant reserves the right in this connection to submit a separate patent application.

The figures show exemplary embodiments of the present invention. The figures show FIG. 0 significant values for the design of light guiding slats.

FIG. 1 a light guiding slat according to the state of the art.

FIGS. 1.1, 1.2, 2.1, 2.2, 2.3, 3.1, 3.2, 2.3, 3.4 the light guidance on a slat according to FIG. 1.

FIG. 4 an embodiment of the light guiding slat according to the invention

Figure 5:
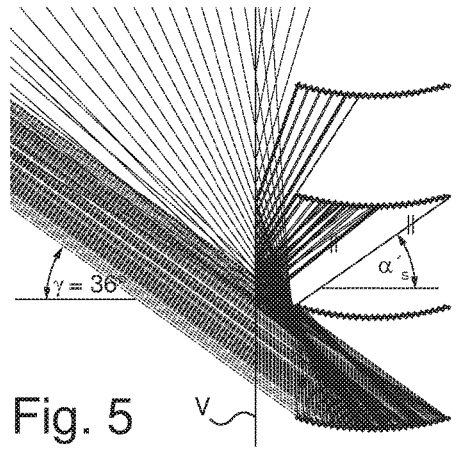
Figure 6:
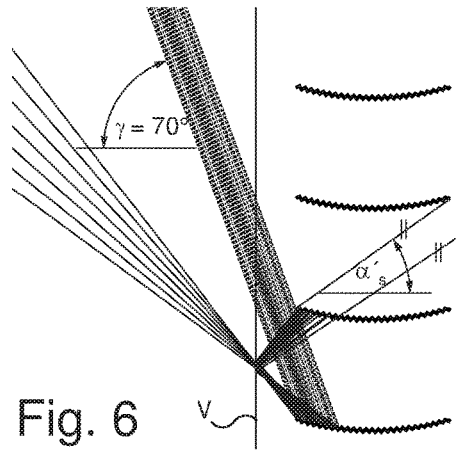

FIGS. 5 and 6 the light deflection on the slats of FIG. 4 for a sun radiation of 30° and 70°

Figure 7:
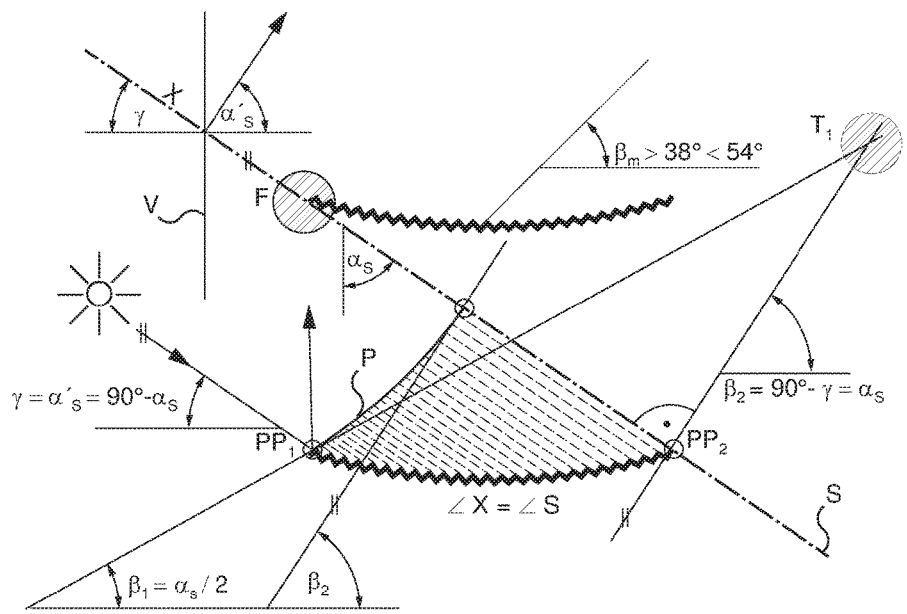
Figure 10:
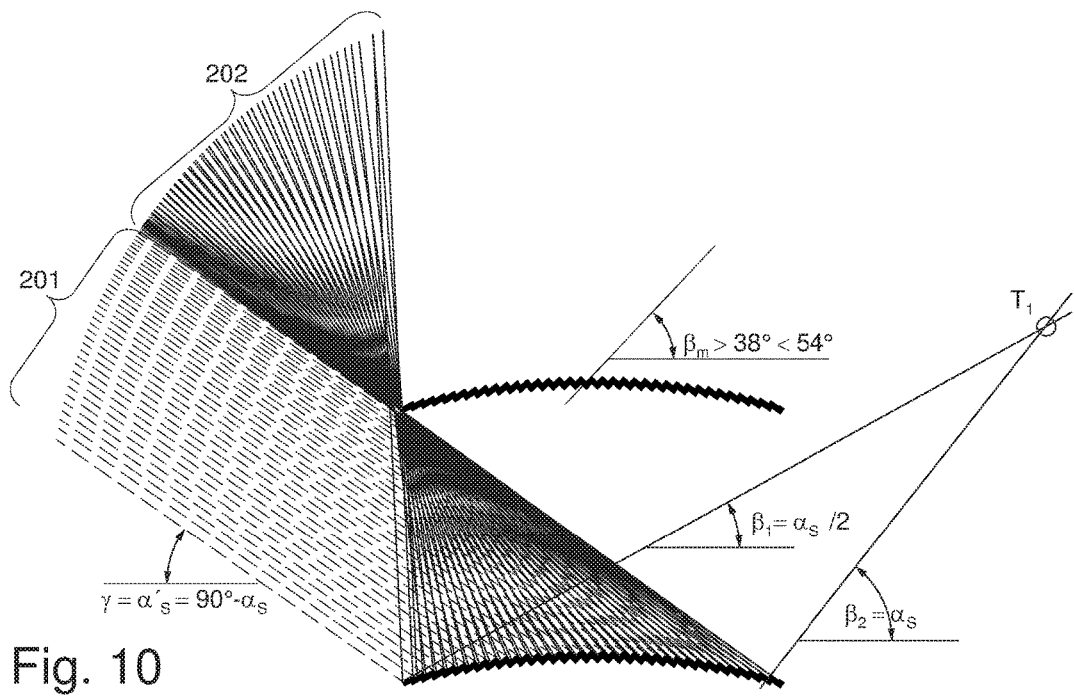

FIG. 7 a further embodiment of the light guiding slat according to the invention FIG. 8 a comparison of energy transmission and absorption of sun protection system as a function of the angle of incidence of the sun FIG. 9 a further embodiment of the light guiding slat according to the invention having partly flattened tips of the individual folds FIG. 10 a further embodiment of the light guiding slat according to the invention having a convex upper side.

FIG. 11 a perspective of the slat upper and under sides of a further embodiment of the light guiding slat according to the invention FIG. 12 the energetic behaviour of the slat curtains in comparison FIG. 13 an enlargement of a cross section of a slat of FIG. 10

Figure 14:
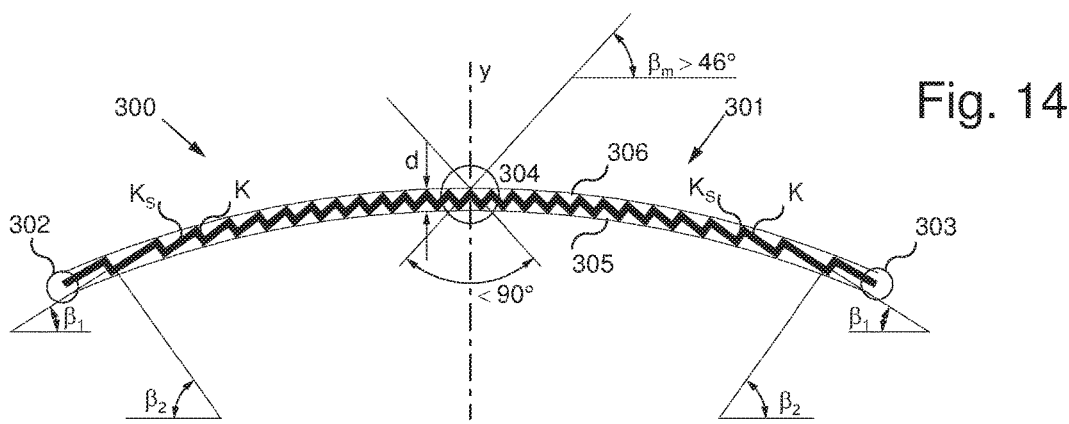
Figure 15:
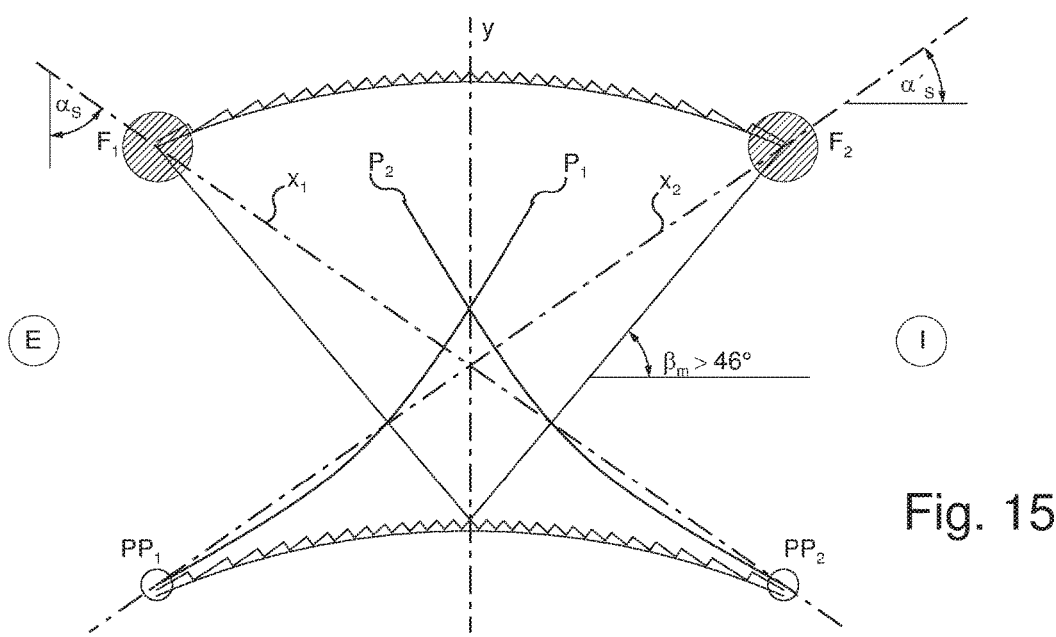

FIG. 14 a cross section through a further embodiment of the light guiding slat according to the invention FIG. 15 a representation of the construction principle for the surface contour of the slat of FIG. 14

Figures 16, 17:
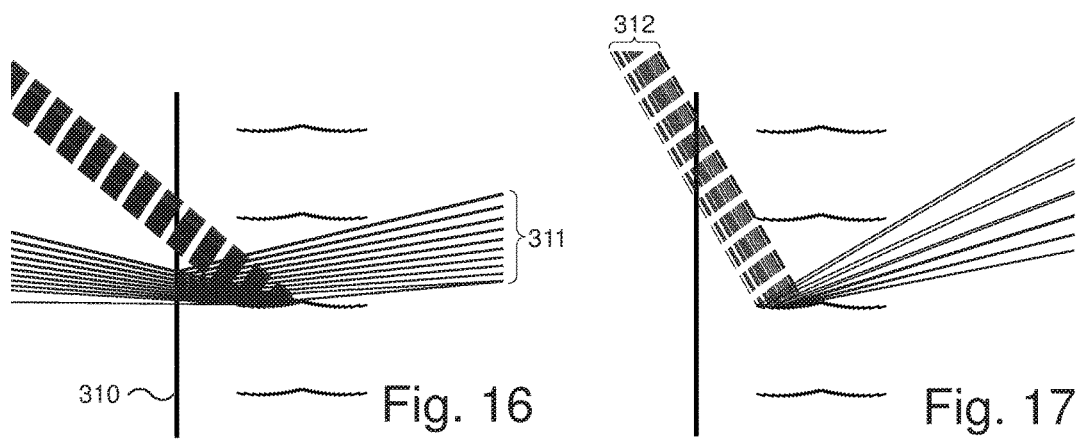

FIG. 16 and FIG. 17 a further embodiment of the light guiding slat according to the invention in butterfly shape of the embodiment of FIG. 14 to be arranged in the upper window area with light deflection downwardly FIG. 18 the slat of FIG. 14 with light deflection towards the interior which takes place in the slat centre FIG. 18.1 shows the light distribution by the slats of FIG. 18

FIG. 18.2 a detail of the light guidance structure for deflection towards the interior of FIG. 18

FIGS. 19 to 20 a slat as in FIG. 18 but with light deflection towards the interior in the area of the slat cross section portions positioned at the irradiation side or at the opposite side.

FIG. 21.1 to FIG. 21.3 the reflection behaviour on the slat under sides of the slat of FIG. 18.

Figure 22:
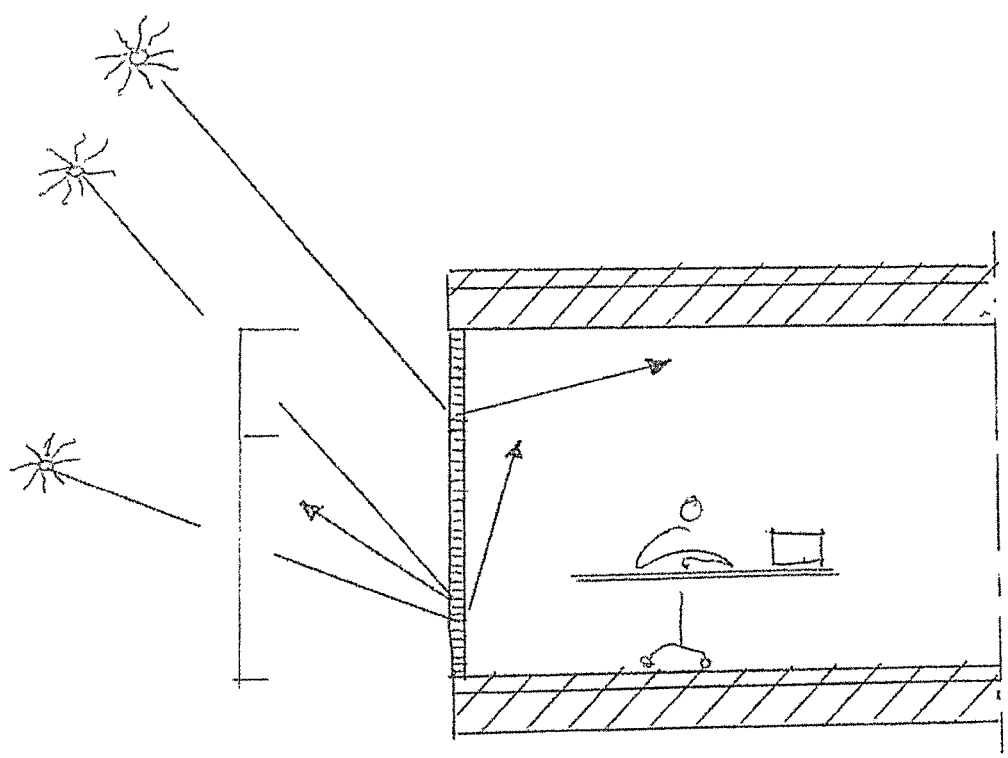

FIG. 22 schematically shows, in partial cross section, the sun protection system.

In FIG. 4 the construction specifications for a horizontal operation position of the curves are defined. In the present case, the ratio of slat distance a to slat width b is a/b~0.7. However, this ratio may optionally e selected. For an optional ratio a/b, the inclination β of the sun-irradiated fold sides $K_S$ in the area of the slat edges to the horizontal will be explained in the following.

Valid for the horizontal position is $\alpha'_S = 90° - \alpha_S$. $\alpha_S$ is the inclination of the shadow line S relative to the vertical V or the vertical glazing of a facade to which a sun protection system as shown in FIG. 22 has been applied in which the slats are arranged. For the inclinations β of the sun sides $K_S$ in the area of the slat edges relative to the internal space I; the following standard is valid $$\beta_1 = \alpha_S/2$$

$$\beta_2 = \alpha_S$$

$\beta_1$ is the angle of incidence of the sun side $K_S$ relative to the irradiation side near the irradiation area E. $\beta_2$ is the angle of incidence of the sun side K near the interior space I. $\beta_n$ are the angles of incidence of any optional sun sides $K_S$ within the slat cross section. $\beta_m$ is the angle of incidence in the centre of the slat. The fold sides $K_S$ may be disposed before other reflectors of different optics (see FIG. 20) or after them (see FIG. 19). Reflectors of different optics, for instance light guidance elements with opposed light guidance (FIG. 18), may be arranged within the slat cross section as well. However, curtains having slats are also conceivable which do not have an angle $\beta_1$ in the irradiation area nor an angle $\beta_2$ towards the interior space because it is primarily the plurality of the fold angles $\beta_n$ between $\beta_1$ and $\beta_2$ which counts. Preferably, the fold angles $\beta_n$ are between $\beta_1$ and $\beta_2$.

In FIG. 4, the sun sides $K_S$ are positioned in a continuous rhythm in a steeper position between $\beta_1$ and $\beta_2$. As an angular rhythm, the following may for instance be valid $$\frac{(\beta_2 - \beta_1)}{n}$$

n is the number of folds between the folds in the irradiation area E and the interior space I behind the façade. The positioning of the folds is realized on a concave/convexly curved contour. The concave/convex arching is determined according to the requirements of stiffness/moment of resistance of the slat prior to starting the construction by the height h and amounts in the present case for instance to h~1/9 to 1/13 of the slat width b. The slats may concavely be arched downward or convexly upward. The folds are preferably shaped as micro folds having edge lengths of from <2 mm to 0.5 mm and smaller edge lengths or also larger edge lengths. As explained in FIG. 4, this may either refer to a plurality of parallel folds or to only a few, for instance 2 or 3, folds in case of very narrow slats having a width of from 5 to 10 mm.

The formation of angles $\beta_1 = \alpha_S/2$ and $\beta_2 = \alpha_S$ need not be precise. Alone by manufacturing tolerances, small different angles might be obtained. Deviations of ±5° do in fact ameliorate effectiveness and functionality of mirror systems—even minimum glares might come up in case of back reflection in the outer glazing. Minimum roundings off will come up in the production of the tips of the folds. The point of the present innovation is to find out the desired values for the tool manufacture. With a view to tolerances, focussing zones might also come up as shown, as an example in FIG. 7 and other figures. Sun incidence of >50° may be reflected at an angle <$\alpha_S$ in the glazing and might lead to minimum glare in it. In countries having low sun altitudes, this would be insignificant. It is recommended to realize a glare freedom of minimum 60° angle of incidence. With a view to the reflection on the outer glazing, sun incidence of >70° can substantially be neglected. For the angles $\beta_1$ and $\beta_2$ defined in the present case, however, the construction is glare-free for all angles up to a light incidence of 90°.

Of no problem for avoiding any glare is $\beta_2 < \alpha_S$.

If the ratio of a to be changes, the rule $$\beta_1 = \alpha_S/2; \beta_2 = \alpha_S$$

may continue to be used.

As an alternative to the continuous increase of the angles $\beta_1$ relative to $\beta_2$, an irregular increase/decrease may be selected as shown in the second portion of FIG. 4. In this case, the angles $\beta_n$ of the sun-irradiated fold side $K_S$ and the angle of the shadowed fold side K in partial zone (1) to the irradiation cross section were determined as $\beta_n$ 45°, in partial zone (2) to the interior space as 40° each. Of advantage is a right angle between K and $K_S$ so that in case of double reflections between K and $K_S$ back reflection in the elevation angle of sun irradiation is obtained.

The shaping of the slats is not only restricted to the concave/convex arching. The slat may additionally also be edged so that in the cross section slat parts will result by which an irregular adjustment to the required angle $K_S$ occurs (FIGS. 16, 17). Not only the slat itself may be arched concave/convexly, so may the edges of the folds as well. Particularly in case of larger folds, it is recommended to arch the fold sides concavely.

In FIG. 4, $\beta_1 = 18°$ and $\beta_2 = 54°$. These data on the angles may be particularly advantageous for the ratio a/b~0.7. The optical effects of the slat constructions can be taken, as examples, based on the ray tracing in FIGS. 5 and 6. The light radiation back-directed into the glazing V and reflected to the interior space impinges exclusively onto the under side of the upper slat without falling into the observer's eye in the interior space or causing any glare.

FIG. 5 shows the sun irradiation parallel to the shadow line $\alpha_S = 36°$. In case of light incidence parallel to the shadow line, no glare will occur by the back-reflection reflected by glazing V. All reflections in the glass will exclusively impinge upon the under side of the upper slat since no ray >$\alpha_S$ will be reflected.

FIG. 6 shows the ray tracing for high summer sun at an angle of 70°. No reflected ray exceeds angle $\alpha_S$. In this way again it is ensured that the reflections will impinge solely upon the under side of the upper slat while no glares will occur.

In addition to the process for determining the fold shaping in relation to the arching and the distance of the slats from one another, a further process for determining the formation of the angles $\beta$ is suggested in FIG. 7:

A parabola axis x is put into shadow line S. Focus F is put onto the under side of an open slat in the irradiation area E and may with a view to the tolerances referred to in the beginning form a focussing zone which is shown, as an example, as a dotted circular surface. The focussing zone is preferably as small as possible, which becomes possible by a most precise generation of the geometry of the slat and/or by using thinnest band material. A parabola point PP is put into the starting point of a lower slat in a sun protection system having a plurality of slats arranged in parallel relative to each other and one above the other on the sun irradiation side E. The tangent inclination $\beta_1$ is $\alpha_S/2$. The zero point of the parabola has the tangent inclination $\alpha_S$. The parabola P with the parabola axis X in the inclination angle $\alpha_S$ of the shadow line S is fragmented and the individual fragments are shifted in parallel up to the desired slat contour. All fold sides $K_S$ should depending on the production quality be in most exact alignment with a point of impact T.

Even if the sun side $K_S$ of the first fold in angle $\beta_1$ or the last fold in angle $\beta_2$ do not exist since the slat includes further functional portions (see FIG. 19 or FIG. 20), the construction according to the invention at angle $\beta_n$ with parabola axis X in coincidence with shadow line S remains, nonetheless, valid.

In FIG. 9, the slat of FIG. 4 is shown having partly flattened fold or prism tips in a partial zone (2) oriented toward the interior space I. By the flattening, a superposition of the fold structure by a second light guiding system occurs by which the radiation impinging onto the flattening is deflected into an opposite direction, i.e. towards the inside. In the lower window area of a window between the interior space I and a sun protection system with the slats, the flattening is advantageously directed toward the interior space I, in the upper window area or the sky light area of the window, however, towards the irradiation area so that in the sky light area steeply inciding radiation can be deflected into the room depth. The light deflection at the flattened fold tips in the lower window area is shown by the inciding ray bundle 10 and the deflected ray bundle 11. In the sky light area, the same slat type from FIG. 9 is installed rotated about 180° about a vertical axis.

In order to explain the advantage of the present invention under energetic points of view as compared to the prior art, diagrams are shown in FIGS. 8 and 12. On the abscissa, the sun incidence angles are shown with relation to the vertical. On the ordinate the total energy transmission g or the proportionate absorption in % is depicted. The following characteristics are shown:

Characteristic 100 shows the total energy transmission g of a light guiding slat in combination with a single-pane glazing with 80% total reflection of the anodized aluminium surface as in accordance with the state of the art of FIGS. 1, 2 and 3. Characteristic 101 shows the total energy transmission g of an innovative light guiding slat according to FIGS.

4, 5 and 6. The dashed area between line 100 and line 101 shows the reduced total energy transmission g or the significantly improved reduction of the energy input in view of the optimized innovative shaping of the slats which effects a smaller summery heating up because of the mono-reflectivity or effects that the pendulum reflections between the slats are avoided.

The absorption on the slat according to FIG. 1 is shown by dashed line 103; the absorption on the slat of the invention of FIG. 4 is shown by line 103. The marked area between line 102 and 103 in FIG. 8 shows the increased absorption in view of the multi-reflectivity of the prior art and the significantly improved sun and heat protection of the slat of the invention in case of summery angles of incidence of a sun incidence starting from 30°.

Line 104 shows the direct transmission between the slats in case of horizontal slat position. It is identical for both slats since the identical ratio of slat width b to slat distance a and the horizontal slat position was selected.

FIG. 10 shows the variant of a folded slat having a convex slat upper side and a concave slat under side. In this case, the construction rules are valid as for instance explained in connection with FIG. 7 in that the convex upper side of the Fresnel mirror is either shaped in or bossed in. Here, a ray bundle 201 is shown at an angle $\gamma=90°-\alpha_S=\alpha'_S$ and the primary reflections 202. The optical behaviour of the slat corresponds to that of the concave/convex slat of FIGS. 4, 5 and 6. The catheti of the fold $K_S$ ideally intersect again a point of impact $T_1$ by which a further construction principle of the slats is described.

The construction methods referred to above are defined on the base of a horizontal operational position of the slats. The embodiments of the slats are not, however, restricted to a horizontal operational position of the curtain. To be able to look from the work place at the window to a street at a lower level, a slat tipping angle of 10° to 45° to the outside might be considered as an optimum. In this case, the same construction methods might be applied to a tilted slat. Because of the horizontal plane disposed obliquely relative to the surface of the slat, a deviating geometry of the slat upper side will result with substantially the same effect. The folds are arranged twisted relative to the slats for horizontal standard alignment and have different side lengths. The innovation is not, therefore, restricted to the horizontal position of the slats although this position is shown as particularly advantageous.

FIG. 12, on the other side, shows the total energy transmission g in % of the slat system/Venetian blinds as a function of the angle of incidence of the sun behind a one-pane glazing. Curve 204 (100) of the slat of FIG. 1 is considered the state of the art. Curve 203 shows the optimized slat of FIG. 7 and FIG. 10. The hatched area 205 shows the reduced g value while the edge conditions are the same. The g value of the slat of FIG. 4 is dashed in curve 206 (see also 101 in FIG. 6). This shows clearly the optimization process of the constructions. The improved g values between the slats according to FIG. 4 and FIG. 10, as compared to the state of the art of FIG. 1, result from reduced secondary reflections between the folds or the primary sides and from less reflections onto the under sides of the upper slats (ping-pong effect), particularly in case of flatter angles of incidence.

FIG. 13 shows a detail of the fold of the slat section of the slat of FIGS. 10 and 14. Here, it is demonstrated that the individual folds become larger towards the edges and smaller towards the centre. The sun sides $K_S$ 120 to 124 become smaller from the edges toward the centre as well.

FIG. 14 shows a slat which follows the construction method of FIG. 10 which, however, has an advantage over the slats of FIGS. 4, 7, 10. The latter have an unsymmetrical slat cross section. In practice and in view of the similarity of the slat halves, the natural eye cannot recognize which slat edge is to be oriented to the outside and which slat edge to the inside. In practice, it might happen that the slats are incorrectly fitted in a sun protection system fitted. To avoid such fitting-in error in the curtain, the slat of FIG. 14 is suggested which is characterized by a symmetrical construction of the two slat halves 300 and 301, wherein the slat halves are reflected on symmetry axis y. Such symmetrical contour also simplifies the rolling process and avoids the undesired "Camber effect", i.e. a side distortion of the slats. The reflected fold or prism flanks to the fold flanks which, as shadow sides K of the folds are in the shadow on the slat half oriented to the direction of the irradiation side, are now, as sun sides K of the folds on the slat half 301 on the other side in cross direction of the slat exposed to the sun and follow as to their inclination angles also in symmetry the logic of the fragmented parabola.

According to FIG. 15, the construction is performed following the following rule: The construction of parabola $P_1$ is reflected at the central axis y. Parabola $P_2$ results to which belongs a focussing zone $F_2$ at the final point of the upper slat toward the interior space. In this way, the shadow sides K have the geometry of a spatially displaced fragmented parabola $P_2$.

As the starting material of the slats described with reference to the figures, a flat band may be used having a thickness of from 0.1 mm to 0.4 mm which, advantageously, is already provided with a ready metallised or good reflective surface. A typical total thickness d of slats up to a width of 100 mm measured from fold tip to fold tip amounts to about 0.2 mm to 1.0 mm, preferably 0.2 to 0.3 mm where the total thickness d is constant over the complete cross section. This makes it possible to wind the band after shaping-in again on a coil and to later reshape it concave/convex in a roll gap.

The idea underlying the invention consists in shaping the thickness d so small that the folds do not deform when being wound on a coil. While the slats become stiffer through such folding which is considered a well desired effect, they do retain their flexibility without buckling. In this way, the bands may be further processed off the coil as semi-finished products by traditional venetian blinds automats and manufactured to ready venetian blinds curtains. To this end, the concave/convex roller sets available in production machines and dies with hole and cutting shears may be adapted to the total thickness d. In order not to damage the fold tips it is conceivable to use rubber or plastic rollers.

An advantageous method for producing the innovative slats consists in guiding a flat band between a pair of rolls having a structured top roll and a structured bottom roll and to shape the flat band between the rolls to the desired micro or fold structure. Top and bottom roll have a uniform prismatic lacing with a concave-convex contour.

In a further operational step, the fold-structured flat band may be arched or reshaped to a concave/convex shape by which an angular displacement $\beta_n$ of the already pre-formed terminal angles $\beta_1$ and $\beta_2$ takes place. Via the segment height h of the slats, the angle $\beta_1$ and $\beta_2$ may be adjusted.

From the point of view of the production process, too, it is of advantage to shape the individual folds symmetrically as shown in FIG. 4 or in connection with the slat halves in FIG. 15 to avoid axial forces in the rolls. When symmetrically formed, exclusively vertical compressive forces will occur between the pair of rolls so that axial strain of the roller bearings, on one hand, and the risk of an oblique or uneven strain entry in the slat, on the other. with the consequence of the exit of twisted and/or obliquely folded slat will be reduced.

It is, however, extremely difficult to shape the slats, in a second procedural step, to the desired concave/convex form since in the roller tool, the slats are in contact with the rolls only via the tips of the individual folds. This might cause the slats to "swim" in the tool. The folded band might run out of track. It is, however, conceivable to enter into this roller tool in addition to the concave/convex form, the form of the folds so that the pre-formed band will stick in a large area to the band. The concave/convex shape of the tools may consider that after deforming the slat may elastically spring back into its final form.

A further production process provides, therefore, that in a first procedural step the slats are shaped to a concave/convex form and in a second procedure step to the microstructure.

In FIGS. 16 and 17, the slats of FIG. 14 are formed in a further procedural step butterfly-shaped, or double concave/convex, with two adjacent arcs. These slats are mainly used in the sky light area of windows to deflect steeply inciding light 312 to the depth of the interior space. This refers also for flatter angles of sun incidence, as shown in FIG. 16. Completely contrary to the lower window area where deglaring of the panes and slat surfaces is desired, the light above eye level is back reflected in such a flat manner into outer glazing 310 by the special fold shape that the reflection in pane 311 may be deflected between the slats into the depth of the interior space. To realizes such effects, a slat is used which in comparison with the slat of FIG. 14 with concave under side is rotated about 180° upwards and then tipped in the centre.

FIG. 18 shows a slat of FIG. 14, however, with a changed folding (2) 341 in the slat centre. The folding has very flat angles of the shaded fold side K so that the inciding sun is deflected in the slat centre into the interior space I. The sun side $K_S$ follows the angular course $β_n$ of FIG. 14. FIG. 18.2 shows an enlargement of the folding of the middle portion (2) 341. In the present case, there results a fold angle of about 120°. FIG. 18.1 shows the light distribution towards the interior and toward the outside (E) on façade level 340.

In FIG. 19, the second portion (2) of a slat disposed towards the interior space I of FIG. 14 with light deflection to the interior space ceiling is shown. At a light irradiation at the angle $α_S$ in parallel to the shadow line, a focussing zone F is formed in the area of the interior space edge of the upper slat. This slat is primarily used in the lower window area. By the steep light re-direction to the interior space ceiling, glare of the user of the interior space is avoided.

FIG. 19.1 shows the light distribution for an angle of incidence of the sun according to FIG. 19 on façade level 340.

FIG. 19.2 shows the particular light deflection of portion (2) 342. The sun-irradiated fold sides 322, 323 and further ones show a very flat angle. The shadowed fold side follows the Fresnel optics of the sun-irradiated fold sides on the irradiation side of the curtain. The fold angle α amounts to between 120° and 140°, in the present case to 130° and effects a light deflection outside of the focussing zone.

FIG. 20 shows the slat of FIG. 19 rotated about 180° about a vertical axis. The arrangement of portion (2) 343 toward the irradiation side is selected in the upper window area of a curtain in order to re-direct horizontal radiation in flat angles into the interior space. The light distribution on façade level 340 is shown in FIG. 20.1.

The advantage of a provision of portions (2) with opposed light guidance consists also in that one single slat type will make possible, without any tool change and only by slat rotation about 180°, a user-adapted glare-free light guidance, or, light deflection, in the lower and the upper window area in favour of space depth illumination and saving an otherwise common electric illumination.

FIGS. 21.1 to 21.3 show the light re-direction on the folded slat under sides. In FIG. 21.1, a ray bundle 350 impinges from the upper side of a lower slat to the under side of an upper slat. This ray bundle results from an angle of sun incidence $>α_S$ at horizontal slat position, for instance the slat of FIG. 19.

FIGS. 21.2 and 21.3 show the light re-direction at or between the folds. Most of the rays 359 in FIG. 21.3 are re-directed to the upper side of the lower slat and therefrom directed to the sky. Only a very small proportion 352 will meet the observer's eye in the interior space.

Since the slats are preferably provided to reflect diffusely from the under side, which means that they are for instance kept in white, light scattering will primarily occur, which does not glare since the inner sides of the folds are hardly visible in a horizontal line of view from the inside to the outside, which constitutes a significant advantage of the micro folding of slat under sides.

The invention claimed is:

1. Light guiding slat for a sun protection system, wherein the light guiding slat is made of a band material, has an elongated form with a longitudinal direction, a cross direction and an elevation height setting and is provided for the formation of a Fresnel reflector for light guidance with a plurality of folds, wherein at least two neighbouring fold sides (Ks, K) are folded relative to each other and a fold edge extends between these fold sides (Ks, K) in longitudinal direction of the light guiding slat, characterized in that the folds are substantially made by folding and/or bending of the band material and the light guiding slat has a total height (W) which is so small that the light guiding slat has a form to be coilable with a coiling radius of 1 m or less without any substantial plastic deformation, wherein the light guiding slat comprises a soft-annealed material having an elastic limit greater than 300 N/mm².

2. Light guiding slat according to claim 1, characterized in that the light guiding slat
   a) which has a metallic light reflecting upper side provided for sun irradiation and
   b) which has a plurality of parallel folds, wherein
   c) the folds have at least one sun side (Ks) provided for sun irradiation at a sun side angle (3) relative to the cross direction of the slat and a shadow side (K) provided for arrangement in the shadow, and
   d) a plurality of the angles (13) of the sun sides (Ks) increase in the direction of a shadow longitudinal edge of the light guiding slat which is faced by the shadow sides, and
   e) the sun sides (Ks) are made plane and/or, as seen for the upper side of the light guiding slat, convex and/or convex/concavely arched
   f) the folds having at least approximately identical and identically oriented contours that are formed in the upper side and in the lower side into the slat
   g) in a cross section in the cross direction of the light guiding slat whereof a plurality or all of the fold edges on the upper side and a plurality or all of the fold edges on the upper side and a plurality or all of the fold edges on the under side each are arranged on an upper and a lower assumed parallel straight line or parallel curve, respectively, and the light guiding slat is produced particularly from a band material having a base material thickness of from 0.1 mm to 0.5 mm, preferably a base material thickness of from 0.1 mm to 0.3 mm.

3. Light guiding slat according to claim 1, characterized in that at least one fold edge is at least partly rounded or flattened at its tip so that part of the sun radiation (10) impinging on the rounded or flattened folds may be deflected into an area above the shadow longitudinal edge of the light guiding slat.

4. Light guiding slat according to claim 1, characterized in that at least part of the fold contours, particularly all fold contours, are symmetrically formed in a cross section in cross direction of the light guiding slat about a centre axis (y) in elevation height setting so that the light guiding slat is composed in the cross section at least partly and particularly completely of two mirror-inverted slat cross sectional parts (300, 301).

5. Light guiding slat according to claim 1, characterized in that the light guiding slat is bulged to the upper side along the longitudinal direction of the slat, and particularly the widths in cross section of the folds and particularly of their sun sides and of their shadow sides in a direction decrease starting from the sun longitudinal edge of the light guiding slat to the centre of the slat (3) in cross section.

6. Light guiding slat according to claim 1, characterized in that a plurality of point angles (a) between sun sides (Ks) and inherent shadow sides (K) of folds are formed, obtuse-angled, in a partial area (2) of the upper side of the light guiding slat so that a light deflection in the direction of an area above the shadow longitudinal edge of the light guiding slat may be obtained, wherein particularly the folds having an obtuse-angled point angle are arranged in an area about the centre of the slat in cross section or in an area between this centre of the slat and a sun longitudinal edge of the light guiding slat faced by the sun sides of the folds, or in an area between this centre of the slat and the shadow longitudinal edge of the light guiding slat, and/or particularly the point angles (a) amount to about 100-140°, preferably 120-130°.

7. Application of light guiding slats in a sun protection system, characterized in that the light guiding slat according to claim 1 is employed, wherein particularly in an upper area of the sun protection system the same type of light guiding slats is employed as in a lower area of the sun protection system, wherein light guiding slats arranged in the lower area have the same alignment in the sun protection system,
wherein a light guiding slat arranged in the upper area in relation to these light guiding slats in the lower area
is arranged, rotated about 180° about a vertical axis, in the sun protection system for guiding steeply from above inciding light through the sun protection system or
is arranged rotated about 180° about a horizontal axis so that the side of the light guiding slat which when arranged in the lower part of the sun protection system forms a concave under side, constitutes in the built-in situation in the upper area the upper side which is oriented towards the inciding sun light, wherein the light guiding slat, on basis of the shape of the light guiding slats in the lower area, is formed in butterfly shape with two concave arcs disposed side by side in the upper side of the total form of the light guiding slat, and is used for guiding steeply from above inciding sunlight through the sun protection system.

8. Method for the manufacture of fold-shape structured light guiding slats,
wherein the light guiding slat is made of a band material, has an elongated form with a longitudinal direction, a cross direction and an elevation height setting and is provided for the formation of a Fresnel reflector for light guidance with a plurality of folds, wherein at least two neighbouring fold sides (Ks, K) are folded relative to each other and a fold edge extends between these fold sides (Ks, K) in longitudinal direction of the light guiding slat, characterized in that the folds are substantially made by folding and/or bending of the band material and the light guiding slat has a total height (W) which is so small that the light guiding slat has a form to be coilable with a coiling radius of 1 m or less without any substantial plastic deformation, wherein the light guiding slat comprises a soft-annealed material having an elastic limit greater than 300 N/mm$^2$,
comprising roll forming, characterized in that in a first operational step, an overall contour of the light guiding slat, seen from above as concave or convex, is formed into a thin band, and in a second operational step, in a roll gap with a fold mould provided between a top roll for the upper side of the slat and a bottom roll for the under side of the slat, folds are formed-in, wherein the second step follows the first one or the first step follows the second.

9. Sun protection system with a plurality of light guiding slats arranged parallel relative to each other and vertically spaced one above the other, characterized in that the light guiding slats are manufactured according to claim 8.

10. Method according to claim 8, characterized in that the top roll has fold edge forming sections with sharp-edged tips and the opposed bottom roll has fold edges forming sections with rounded or flattened tips.

11. Method for the manufacture of fold-shape structured light guiding slats,
wherein the light guiding slat is made of a band material, has an elongated form with a longitudinal direction, a cross direction and an elevation height setting and is provided for the formation of a Fresnel reflector for light guidance with a plurality of folds, wherein at least two neighbouring fold sides (Ks, K) are folded relative to each other and a fold edge extends between these fold sides (Ks, K) in longitudinal direction of the light guiding slat, characterized in that the folds are substantially made by folding and/or bending of the band material and the light guiding slat has a total height (W) which is so small that the light guiding slat has a form to be coilable with a coiling radius of 1 m or less without any substantial plastic deformation, wherein the light guiding slat comprises a soft-annealed material having an elastic limit greater than 300 N/mm$^2$,
characterized in that one upper side of the light guiding slat is produced by roll embossing moulds with a structured top roll, wherein the under side is not embossed and is preferably smooth.

12. Method for the manufacture of fold-shape structured light guiding slats according to claim 11,
wherein the under side rolls on a non-embossing bottom roll.

* * * * *